United States Patent
Zhou et al.

(10) Patent No.: US 10,850,991 B2
(45) Date of Patent: Dec. 1, 2020

(54) SYSTEMS AND METHODS FOR CONTROLLABLE WATER TREATMENT

(71) Applicant: Apex Applied Technology, Inc., Tucson, AZ (US)

(72) Inventors: Guang Zhou, Tucson, AZ (US); Jing Luo, Tucson, AZ (US)

(73) Assignee: Apex Applied Technology, Inc., Tucson, AZ (US)

( * ) Notice: Subject to any disclaimer, the term of this patent is extended or adjusted under 35 U.S.C. 154(b) by 370 days.

(21) Appl. No.: 15/799,891

(22) Filed: Oct. 31, 2017

(65) Prior Publication Data

US 2019/0127236 A1 May 2, 2019

(51) Int. Cl.
*B01D 61/00* (2006.01)
*C02F 1/00* (2006.01)
*C02F 1/44* (2006.01)
*C02F 1/32* (2006.01)
*C02F 1/28* (2006.01)

(52) U.S. Cl.
CPC .............. *C02F 1/008* (2013.01); *C02F 1/442* (2013.01); *C02F 1/283* (2013.01); *C02F 1/32* (2013.01); *C02F 2201/009* (2013.01); *C02F 2209/001* (2013.01); *C02F 2209/02* (2013.01); *C02F 2209/10* (2013.01); *C02F 2209/42* (2013.01)

(58) Field of Classification Search
CPC .... B01D 37/041; B01D 61/00; B01D 61/002; B01D 65/00; B01D 2311/08; B01D 2315/08; B01D 2321/14
USPC ................................... 210/768, 790
See application file for complete search history.

(56) References Cited

U.S. PATENT DOCUMENTS

| | | | |
|---|---|---|---|
| 2005/0109703 A1* | 5/2005 | Newenhizen | C02F 1/441 210/739 |
| 2017/0121200 A1* | 5/2017 | Brozell | C02F 9/00 |

\* cited by examiner

*Primary Examiner* — Allison G Fitzsimmons
(74) *Attorney, Agent, or Firm* — North Weber and Baugh LLP; Michael North (57) ABSTRACT

Various embodiments of the invention relate to a controllable water treatment system, and more particularly, to systems, devices and methods of generating purified water with options of waste recycling and filter membrane rinse protection. The controllable water treatment system comprises a water intake tank, a pretreatment stage, a treatment stage and a purified water storage tank. Water waste output from the treatment stage may be drained or fed back into the water intake tank for recycling. Furthermore, the controllable water treatment system features rinse protection for filter membranes in the treatment stage. Before the system stop operation, water from the purified water storage tank is fed back into the filter stage to rinse the membranes for further protection. Such an application improves the lifespan of the membranes and thus the utility of the controllable water treatment system.

6 Claims, 8 Drawing Sheets

SYSTEMS AND METHODS FOR CONTROLLABLE WATER TREATMENT

BACKGROUND

A. Technical Field

The present invention relates generally to water treatment, and more particularly to systems and methods for water treatment with controllable reject water recycling.

B. Background of the Invention

Water treatment is a process to make water more acceptable for a specific end-use, such as drinking, industrial water supply, irrigation, etc. Water treatment removes contaminants and undesirable components, or reduces their concentration so that the water becomes fit for its desired end-use.

A water treatment system receives raw water input and generates a water output, such as purified water for drinking with contaminants concentration below a certain threshold, and waste water. Typically, the waste water has higher contaminants concentration compared to the raw water and may be drained directly or used for irrigation. There are situations where it is advantageous to further process the reject water (or waste water) therefore increase the overall water recovery rate. In certain situations where the raw water itself is also a precious resource, such as in a dry land or a desert area, directly dumping the waste water may not be a very economic approach, especially if means of further utilizing reject water, such as irrigation and livestock, are lacking. On the other side, recycling the waste water into the water treatment system brings more challenges, such as affecting lifespan of the treatment apparatus or media, requiring more complex process control, etc.

Accordingly, what is needed are systems, devices and methods for intelligent water treatment with controllable waste water recycling to balance the aforementioned issues.

SUMMARY OF THE INVENTION

The invention relates to water treatment, and more particularly, to systems, devices and methods for water treatment with controllable waste water recycling. The implementation of waste water recycling is dependent on monitored parameters of the feed water (also referred to as brackish water, or raw water in this disclosure), reject water (also referred as waste water in this disclosure) and permeate water (also referred as clean water. purified water or product water in this disclosure). In embodiments, the monitored parameters may be a concentration of total dissolved solids (TDS), a concentration of dissolved contaminants such as heavy metal, a concentration of gas such as oxygen, carbon dioxide, a concentration of a specific compound such as ammonium ion, etc.

In certain embodiments, the water process system comprises a water intake tank, a pretreatment stage, a treatment stage, a purified water storage tank, a water pump, water quality sensor(s), disinfectors or UV sanitizer and a controller. The water intake tank couples to a water input valve for receiving water input from one or more water resources, such as from a water well, or a rain water collection facility. The water intake tank further couples to a water drainage valve, which is used, together with the water input valve, to control the volume within the water intake tank. Water within the water intake tank is fed, by a controllable water pump, into the pretreatment stage for pretreatment. The pretreated water is then fed into the treatment stage to further remove or reduce unwanted substances, such that the TDS concentration meets desired threshold, e.g. drinking standard. Filtered or purified water output from the treatment stage is accumulated in the purified water storage tank, and waste water output from the treatment stage is either drained or fed back into the water intake tank, depending on applicable process control.

In some embodiments, the pretreatment stage comprises one or more pretreatment filters coupled in series along water flow direction. The pretreatment filters remove particulates and other solids that may be detrimental to the treatment stage for optimal performance and service lifespan of the treatment stage. In embodiments, the pretreatment filters may be carbon filters to remove chlorine, chloramines and organics, and/or cartridge filters that remove micron sized particulates. In embodiments, the filter parameters of the one or more pretreatment filters are configured in a pre-determined order for optimal pretreatment performance. For example, pretreatment filter at upper stream have a parameter, e.g. micron rating defined as average size of the openings between pieces of the filter media, larger than the pretreatment filter at lower stream.

In some embodiments, the treatment stage comprises one or more Nano filters, which may be arranged in series or parallel for desired filtering performance. Nano filtration is a pressure related process, during which separation takes place, based on molecule size. Nano filters use nanometer sized cylindrical through-pores with typical pore sizes from 1-10 nanometers, smaller than that used in microfiltration and ultrafiltration, but just larger than that in reverse osmosis. One favorable benefit of Nanofiltration is its capacity to process large volumes and continuously produce streams of products. The treatment stage receives pre-treated water and outputs purified water as well as waste water, which has higher TDS concentration than the purified water. Depending on measured TDS concentration in the waste water and control process, the waste water may be drained directly or fed back into the water intake tank for further recovery.

Nanofiltration membranes in the Nano filters are an expensive part of the whole water process system. It would be economically desirable for the Nanofiltration membranes to have a long service lifespan. In certain embodiments, besides applying pretreatment, the water treatment system offers a "self-cleaning" or "rinse protection" process for Nanofiltration membranes protection. When a traditional water treatment system shuts down for various reasons, the Nanofiltration membranes are still soaked within static feed water which has high concentration level of contaminants. Although the pretreatment stage removes some detrimental particulates, some residual particles may still attach or bond to the membranes, clog some membrane orifices and even cause damage to the membranes over time, especially if the water treatment system stops operation for a long interval. To address this issue, in embodiments, the water treatment system comprises a purified water return path which is used to feed purified water from the purified water storage tank back into the treatment stage to rinse the Nanofiltration membranes, such that the Nanofiltration membranes is soaked within purified water. In embodiments, the purified water return path is controlled by a controllable purified water return valve, which is open only when the system is about to shut down or under other predetermined conditions. The rinse time or rinse volume may also be pre-determined or controlled.

In some embodiments, a water quality sensor, such as a TDS sensor, is installed within the purified water storage tank to monitor water quality. If water within the purified water storage tank is stored for a long period of time without being used, the water quality may deteriorate, through natural evaporation for example. When monitored TDS level within the purified water storage tank reaches a predetermined threshold, the water treatment system may recycle the water back into the treatment stage again, or may recycle the water back into the water intake tank for a complete water treatment process, or may even drain the water directly.

In some embodiments, the whole water treatment system is powered by a solar panel based power supply comprising a solar panel array and a battery bank. The solar panel array absorbs sunlight energy to generate electricity for battery charging. Such a configuration enables that the water treatment system is able to function at remote areas where electric grid is not available, or in areas where electric grid was damaged by natural disasters, such as by hurricane, etc. In embodiments, when the solar panel array based power supply is used, the controller monitors the battery voltage to check available electric energy reserve. If the battery voltage falls below a voltage threshold, in order to protect the battery against over discharge, the controller prepares to shut down the system. Before system shut-down, the controller may implement the aforementioned "rinse protection" process for Nanofiltration membranes protection.

One skilled in the art will recognize that the water treatment system may comprise additional components and may be operated in various processes. One skilled in the art will further recognize that the water treatment system may be controlled locally or remotely by the controller. All these variations should fall within the scope of the present invention.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Various embodiments of the invention are used for water treatment with a water treatment system comprising components of water storage tank(s), conduit(s), controlling valve(s), power supply, sensor(s), controller, etc. The components may be placed in the same physical location or different locations. Furthermore, embodiments of the invention are related to various water treatment processes that may be implemented by different systems.

Figure 1:
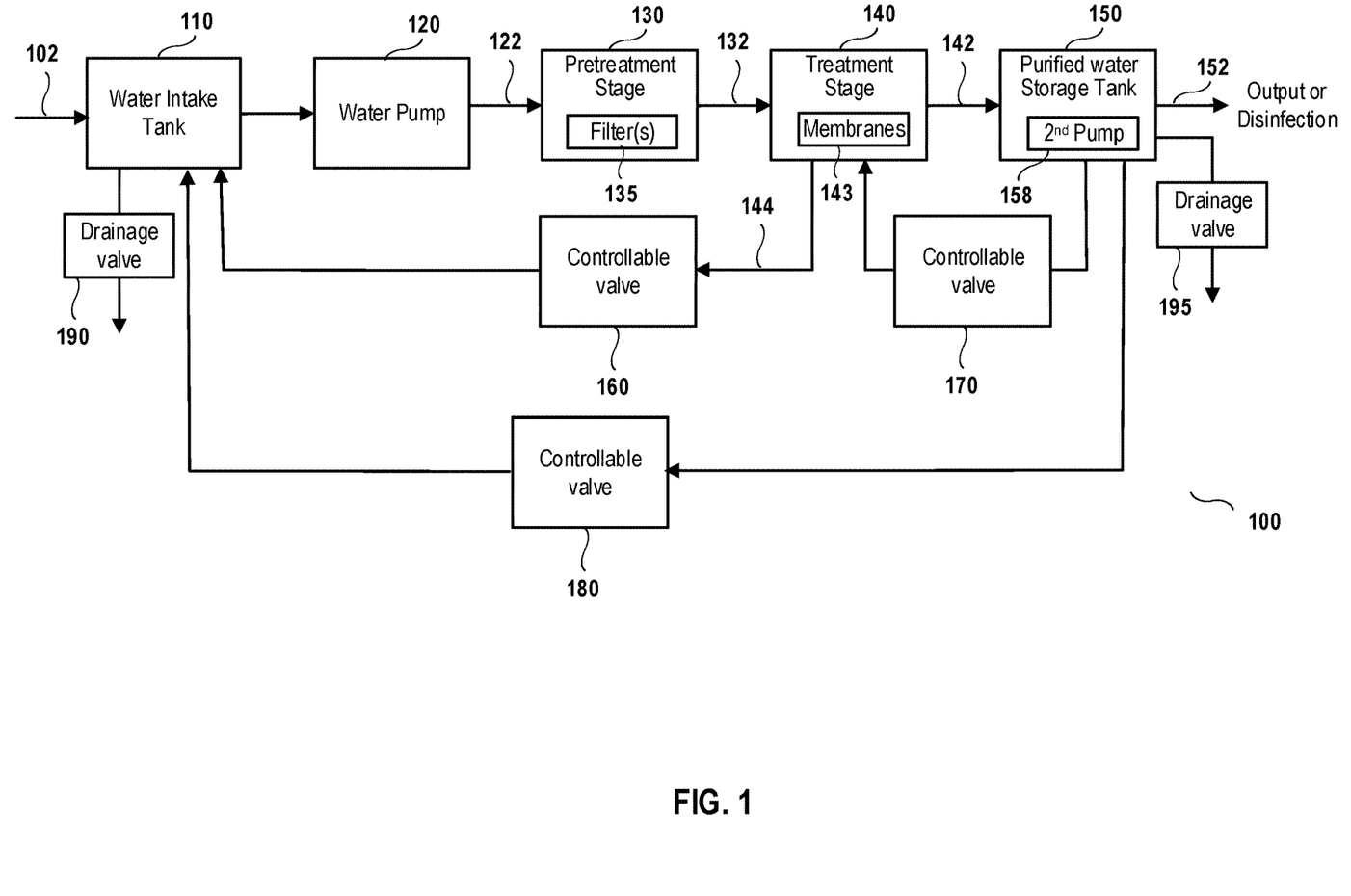
FIG. 1 is a component diagram of a water treatment system, according to various embodiments of the invention.
Figure 4:
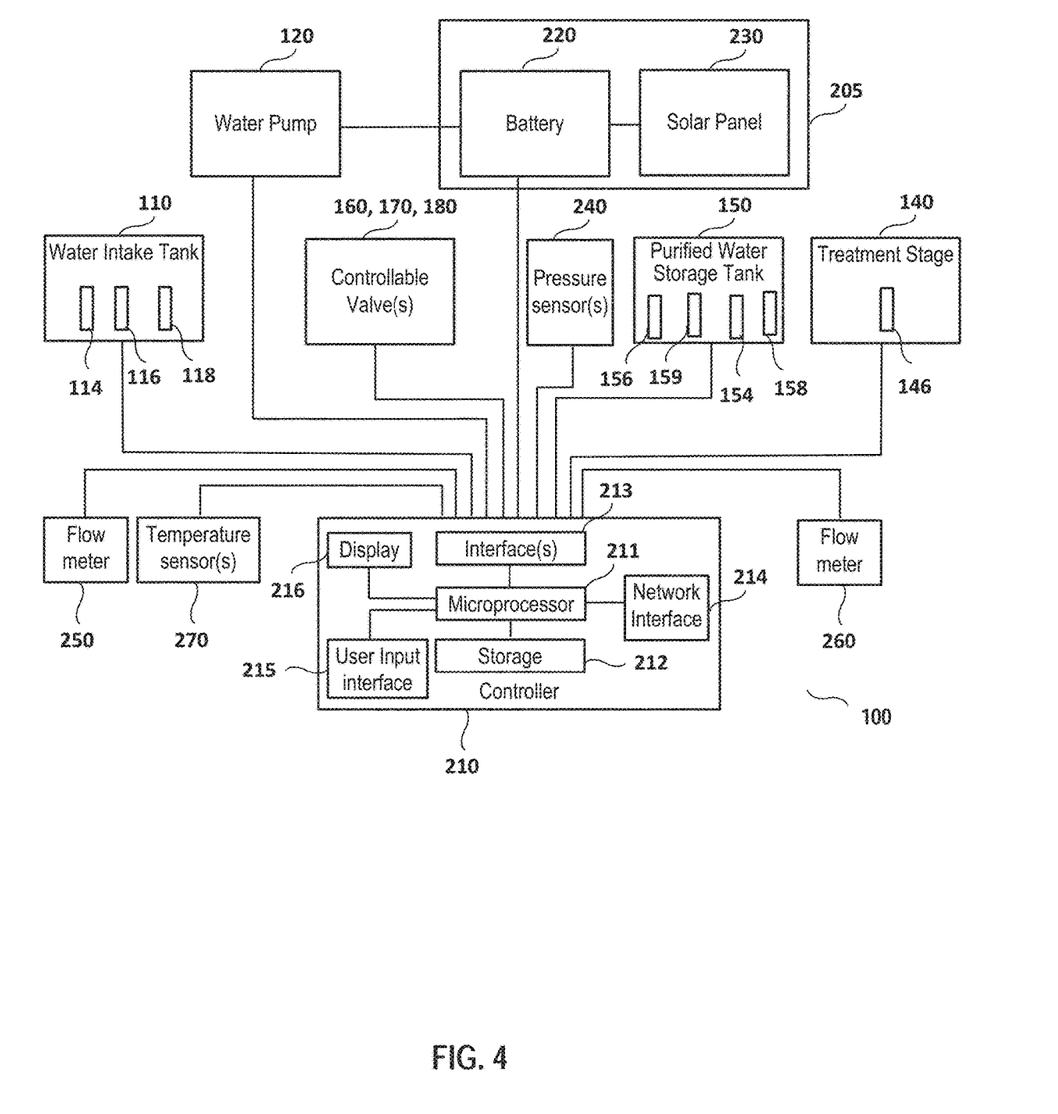
FIG. 4 is a controlling component diagram of a water treatment system, according to various embodiments of the invention.

FIG. 1 is a component view of a water treatment system, according to various embodiments of the invention. The water process system 100 comprises a water intake tank 110, a first water pump 120, a pretreatment stage 130, a treatment stage 140, a purified water storage tank 150, controllable valves 160-180. The water process system 100 also comprises other components, such as power supply, controller, which are shown in FIG. 4 instead. The water intake tank couples to receive water input from a water resource 102, such as from a water well, or a rain water collection facility, etc. Water in the water intake tank is pumped by the first water pump 120 into a pretreatment stage 130. The water pump may be operation parameters pre-selected or adjustable such that water flow 122 from the water pump can be controlled to desired water pressure and/or water flow rate. The pretreatment stage 130 comprises one or more pretreatment filters 135 for water pretreatment. The pretreatment filters 135 remove particulates and other solids that may be detrimental to the treatment stage and service lifespan of the treatment stage. The pre-treated water 132 is then fed into the treatment stage 140 for further reducing unwanted substances, such that the TDS concentration meets desired threshold. Filtered or purified water output 142 from the treatment stage is collected in the purified water storage tank 150, and waste water output 144 from the treatment stage is either drained or fed back into the water intake tank 110 through a first controllable valve 160, depending on measured water quality, such as the TDS concentration, for the waste water output 144 by a third TDS sensor 146 installed within the treatment stage or within waste water output conduit.

In embodiments, the pretreatment stage 130 comprises multiple pretreatment filters 135 coupled in series and arranged in a pre-determined order according to one or more filter parameters. In embodiments, one of the filter parameter is micron rating defined as average size of the openings between pieces of the filter media. For example, for a setup of three pretreatment filters, the pretreatment filter at upper stream has a highest micron rating, e.g. 20 micron. The pretreatment filter at lower stream has a lowest micron rating, e.g. 5 micron. The pretreatment filter in the middle has an intermediate micron rating, e.g., 10 micron. In embodiments, the pretreatment stage 130 may adopt other pretreatment mechanism other than using pretreatment filters. For example, the pretreatment stage 130 may be a chemical, electrochemical pretreatment stage to remove or reduce certain chemical compounds.

In embodiments, the treatment stage 140 comprises one or more membranes 143, which may be arranged in series or parallel for desired filtering performance. The filters may process water based on nanofiltration. Nanofiltration is a pressure related process, during which separation takes place, based on molecule size. Nanofiltration uses nanometer sized cylindrical through-pores with typical pore sizes from 1-10 nanometers, smaller than that used in microfiltration and ultrafiltration, but just larger than that in reverse osmosis. One favorable benefit of nanofiltration is its capacity to process large volumes and continuously produce streams of products. The treatment stage receives pre-treated water and outputs purified water as well as waste water, which has higher TDS concentration than the purified water (and higher than feed water as well). The waste water may be drained directly or fed back into the water intake tank for recycling. One skilled in the art will recognize that the various other filtration membranes, such as membranes for microfiltration, ultrafiltration, or even reverse osmosis, may also be applicable.

In embodiments, the water treatment system 100 further comprises controllable valves 160 and 180, which are used to allow water recycling flow from the purified water storage tank or the waste water output from the treatment stage under applicable condition(s). Such functionalities improve water usage utilities, which is especially more valuable for application in area when clean water source is very limited, such as in desert, small island, remote areas, etc.

In embodiments, the water treatment system 100 further comprises a second controllable valve 170, which is used to allow purified water from the purified water storage tank fed back into the treatment stage to rinse or clean filtering membranes. In embodiments, the rinse procedure is implemented before the system shuts down. Such a procedure ensures that the filtering membranes are soaked in cleaner purified water instead of the pre-treated water for improved protection and service lifespan. In embodiments, the rinse procedure is implemented according to a prescheduled timeline or an automatically controlled rinse cycle such that the filtering membranes may have regular maintenance for optimal filtering performance. The automatic cycle is based on one or more of the following: (1) total processed feed water volume monitored through a first flow meter 250 shown in FIG. 2. The first flow meter 250 may be installed on positions such as water input port of the pretreatment stage or input port of the first water pump) since last rinse; (2) Total permeate water produced since last rinse cycle monitored through a second flow meter 260 shown in FIG. 2. The second flow meter 260 may be installed on positions such as water output port of the treatment stage); (3) Change in membrane pressure differential, which can be monitored by the pressures before and after the treatment stage. A large pressure difference may indicate that the membranes are clogged or partially clogged; (4) Change in production rate. Similarly, a low production rate may also indicate clogged or partially clogged membranes.

In embodiments, the controllable valves 160, 170 and 180 are check valves or one-way valve allowing water to flow through in only one direction. Such configurations prevent accidental wrong flow direction from contaminating the treatment stage or the purified water storage tank.

Figure 2:
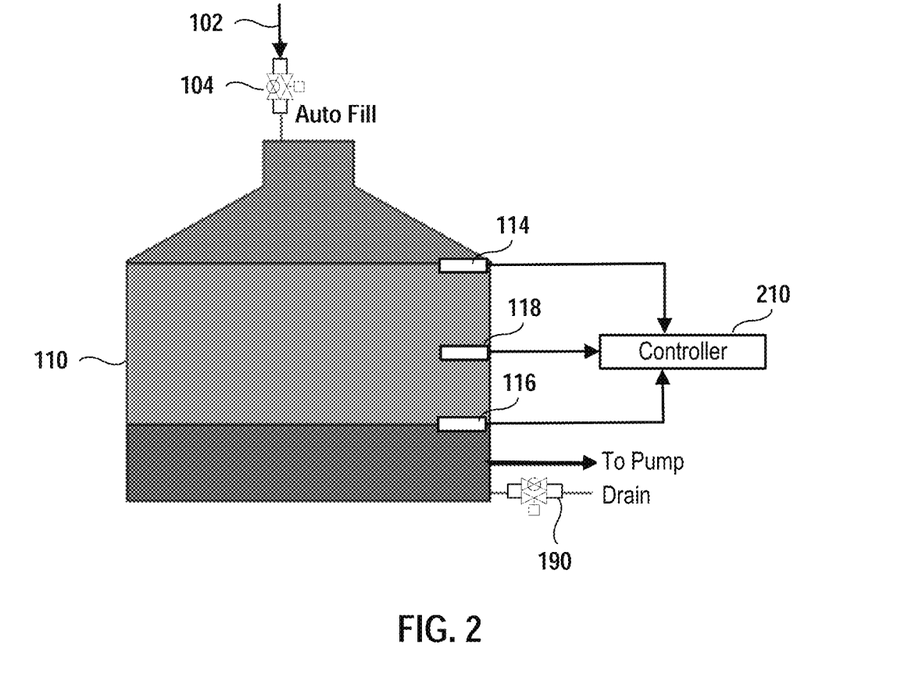
FIG. 2 is a schematic diagram of the water intake tank, according to various embodiments of the invention.

FIG. 2 is a schematic diagram of the water intake tank, according to various embodiments of the invention. The water intake tank 110 comprises a water input valve 104 and a first drainage valve 190, which is used to drain the water within the water intake tank 110 if the water is measured to have a TDS concentration higher than a first threshold, e.g. the upper processing limit of the pretreatment stage 130. In embodiments, the first threshold is chosen as 2000 parts per million (PPM). The first threshold may also be a user-configurable parameter to be set at different levels based on desired contaminant removal level, water recovery rate and desired waste water concentration level, etc. In embodiments, the first threshold may be set a value much higher than 2000 PPM if the TDS standard for the permeate water is around 500 ppm. In embodiments, the first threshold may be set at a value between 2000 and 3000 PPM if the waste water is to be used for irrigation or livestock drinking. The specific values of the first threshold may be dependent on types of crop. The water intake tank 110 is also equipped with an upper water level sensor 114, a lower level sensor 116, and a first TDS sensor 118. The upper water level sensor 114 and the lower level sensor 116 monitor water level, e.g. full or empty, within water intake tank 110. Although two water level sensors are shown in FIG. 2, one of ordinary skill shall understand that other water level sensors may also be used. For example, the upper water level sensor and lower water level sensor may be replaced by a single water level sensor capable of measuring water level along the whole range. The single water level sensor may be a potentiometer, with a floater floats on a water surface and slides a moving contact along a resistor, increasing/decreasing its resistance. When the resistance is at a certain point, it will be viewed by the controller as "tank full" or "tank empty". In embodiments, the water level sensor can also be laser, radar, ultrasonic, magnetic and other technology based. The first TDS sensor 118 measures the TDS level within the water intake tank 110. These sensors are all coupled to the controller 210 such that the controller may receive information for controlling the water input valve 104 and the first drainage valve 190 for implementing applicable water treatment process. In embodiments, the water intake tank may further incorporate one or more temperature sensors (shown in FIG. 4) for temperature compensation. The sensor is applicable for situations where the water storage tank may experience large temperature swing, and accurate water quality measurement (such as TDS) is desired. Such temperature sensor(s) can be used to compensate for the temperature effect. Similar temperature sensor(s) are omitted for FIG. 3, the purified water storage tank as well.

Figure 3:
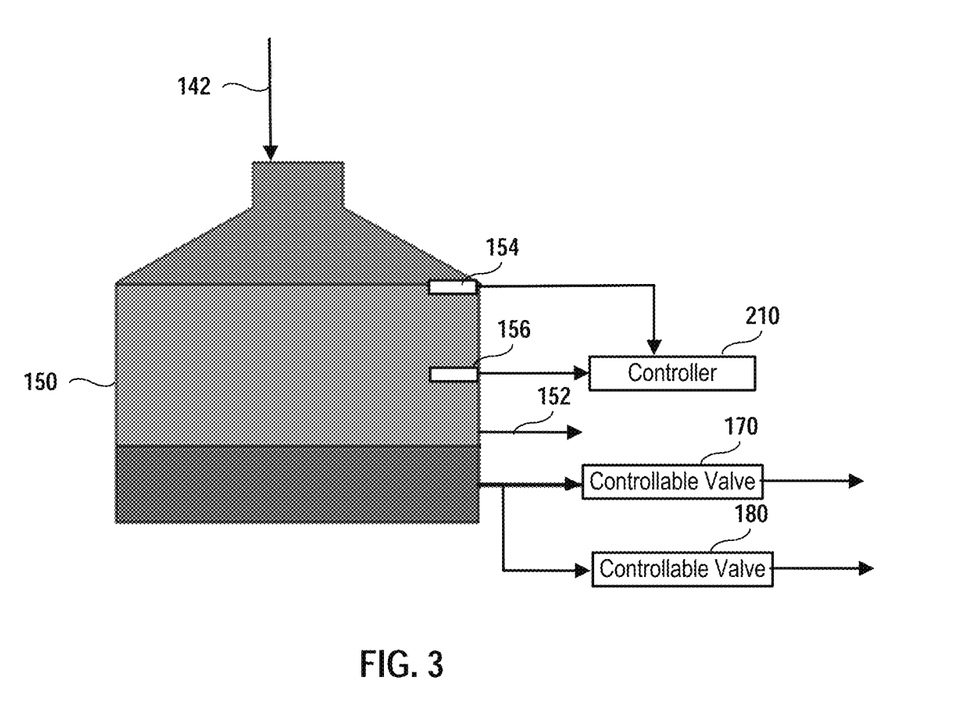
FIG. 3 is a schematic diagram of the purified water storage tank, according to various embodiments of the invention.

FIG. 3 is a schematic diagram of the purified water storage tank, according to various embodiments of the invention. Similar to the water intake tank 110, the purified water storage tank 150 is equipped with a purified water level sensor 154, and a second TDS sensor 156, both of which are coupled to the controller 210. The purified water level sensor 154 is used to monitor whether the purified water storage tank 150 is full such that the controller 210 may decide whether to start/stop system operation. The second TDS sensor 156 measures the TDS level within the purified water storage tank 150 for implementing applicable water treatment process, e.g. enabling purified water output, draining the water within the purified water storage tank 150 via a second drainage valve 195, or recycling the water within the purified water storage tank 150 for re-processing, and guarding against system failure. One of ordinary skill shall understand that other water level sensors may also be used. In embodiments, the purified water storage tank may adopt one upper water level sensor and one lower water level sensor, similar to the water intake tank shown in FIG. 2. The water level sensor 114 may be replaced by a single water level sensor, such as a potentiometer, to measure water level precisely along the whole range. In embodiments, the water level sensor can also be laser, radar, ultrasonic, magnetic and other technology based.

In embodiments, the purified water storage tank 150 further comprises a second pump 158 controlled by the controller 210 to provide desired pressure for the filter water output 152, to enable water pumping from the purified water storage tank 150 via the second controllable valve 170 into the treatment stage 140 for filtering membranes rinsing, or enable water pumping from the purified water storage tank 150 via the third controllable valve 180 into the water intake tank 110 for re-processing. In embodiments, the filtered water output 152 also provides an on-demand access point for end users. Together with UV sanitizer, flow meter and additional applicable instruments, the filtered water output 152 may constitute a complete water supply system.

In embodiments, the purified water storage tank 150 further comprises a UV sanitizer (shown in FIG. 4), which is turned on based on a pre-determined schedule or whenever a water flow is detected filter water output 152. The UV sanitizer prevents microorganism buildup within the purified water storage tank, especially when filter water usage is light. One of ordinary skill in the art shall understand that the UV sanitizer (or additional sanitizers) may also be placed at different locations, such as within the water intake tank, or after the purified water storage tank. Such variations shall still be within the scope of this invention.

FIG. 4 is a controlling component diagram of a water treatment system, according to various embodiments of the invention. As shown in FIG. 4, the controller 210 couples to the all the water level sensors, TDS sensors, controllable valves, the first water pump 120, the second water pump 158, flow meters 250 and 260, one or more temperature sensors 270, and the UV sanitizer 159. In embodiments, the water treatment system 100 further comprises a power supply 205, which includes a solar panel array 230 and a battery bank 220. Using solar panel based power supply eliminates the reliance on power grid, thus enhances mobility and utility of the water treatment system, especially in remote areas. The controller 210 may be configured to monitor the voltage level of the battery 220 to check the energy reserve within the battery for implementing applicable processes. In embodiments, the controller 210 may also comprise one or more current sensors to monitor power usage of the system and that of the controller itself. Such power monitoring provides real time electrical system health feedback. An unexplained change in power consumption is usually a symptom of potential electrical or mechanical failure. In embodiments, the water treatment system 100 further comprises at least one pressure sensor 240, which may couple between the first pump 120 and pre-treatment stage 130 and/or couple between the pre-treatment stage 130 and the treatment stage 140 to monitor real time operating hydraulic pressure. A drop in pressure can be a result of a number of possible mechanical/electrical failures, such as pump failure, loss of feed water, plumbing leak, membrane breakage, etc. On the contrary, excessive pressure can happen when certain valves fail to operate, or filter capacity deteriorate. The controller receives information from the pressure sensor for applicable controlling procedures. In embodiments, the controller 210 may also include flow meters 250, 260 to monitor flow volume of feed water, purified water, waste water etc. In embodiments, the controller 210 may also include an internal temperature (not shown in FIG. 4) coupled to the microprocessor to monitor internal temperature within the controller. In embodiments, the one or more temperature sensors 270 comprise one temperature sensor attached to the battery pack 220 for battery health monitoring. The one or more temperature sensors 270 may further comprise additional temperature sensors for temperature compensation with regards to the TDS measurements. These additional temperature sensors may be submerged to the water intake tank and/or purified water storage tank, have external contact (i.e. attached to external wall of water tanks), or have contactless configurations (e.g. infrared temperature sensors).

In embodiments, the controller 210 comprises a microprocessor 211, a storage medium 212, an interface 213, a network interface 214, a user input interface 215, and a display 216. The interface 213 is multiple channel interface to support communications between the controller 210 and the aforementioned components. In embodiments, the interface 213 may comprise supporting components for communication, such as clock circuit, A/D converter, comparison circuit, cache, GPS, radio etc. The controller 210 may also include a storage 212, which may be in the form of random-access memory (RAM), read-only memory (ROM), or both. The storage stores computer readable algorithms or instructions for implementing various processes. The storage also stores user input via the user input interface 215 and stores data obtained from the water level sensors, TDS sensors, the battery, etc. These data may be accessible via a network interface 214, by a system administrator, for data records or for system diagnostics. The network interface 214 may support wired or wireless data transfer in various protocols, such as Wi-Fi, Bluetooth, etc. The controller 210 may also include a display 216, which may be a cathode ray tube (CRT), a thin film transistor (TFT) display, organic light-emitting diode, electroluminescent panel, plasma panel, or other type of display. In embodiments, the display 216 may be a touch screen, such that the display itself also functions as a user input interface. In embodiments, the controller 210 may also include other components not shown FIG. 4, such as light, speaker, printer, etc., for additional functions.

One skilled in the art will recognize that the controller 210 may also be constructed in various ways, with all components integrated in one field-programmable gate array (FPGA) circuit board, or distributed among multiple printed circuit boards. Furthermore, the controller 210 may even be housed within a local control box or even located remotely for remote control instead of on-site control. In embodiments, the controller 210 may provide auto, manual or idle operation mode. Such variations are within the scope of this invention. One skilled in the art will recognize that the whole water treatment system may be packed in moveable platform, such as within a vehicle, for applications requiring mobility.

One skilled in the art will recognize that the water process system as described in FIGS. 1-4 may be operated to implement various water treatment processes. The processes disclosed below in FIGS. 5-9 are just a few embodiments. A water treatment process may be implemented with only selected steps, with different orders form the presented embodiments, with a combination of selected steps presented in different embodiments, or with some selected steps in more than one embodiment concurrently.

Figure 5:
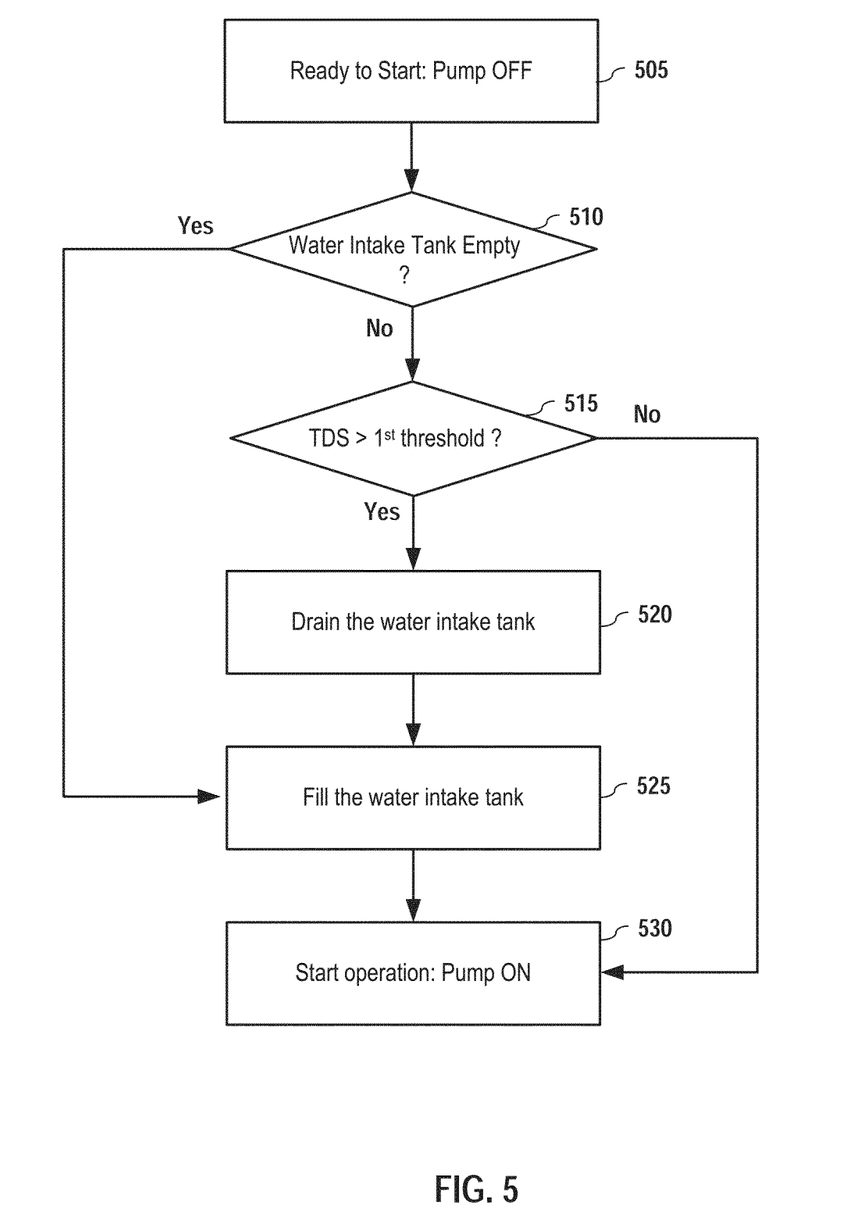
FIG. 5 is a water treatment system starting process, according to various embodiments of the invention.
Figure 6:
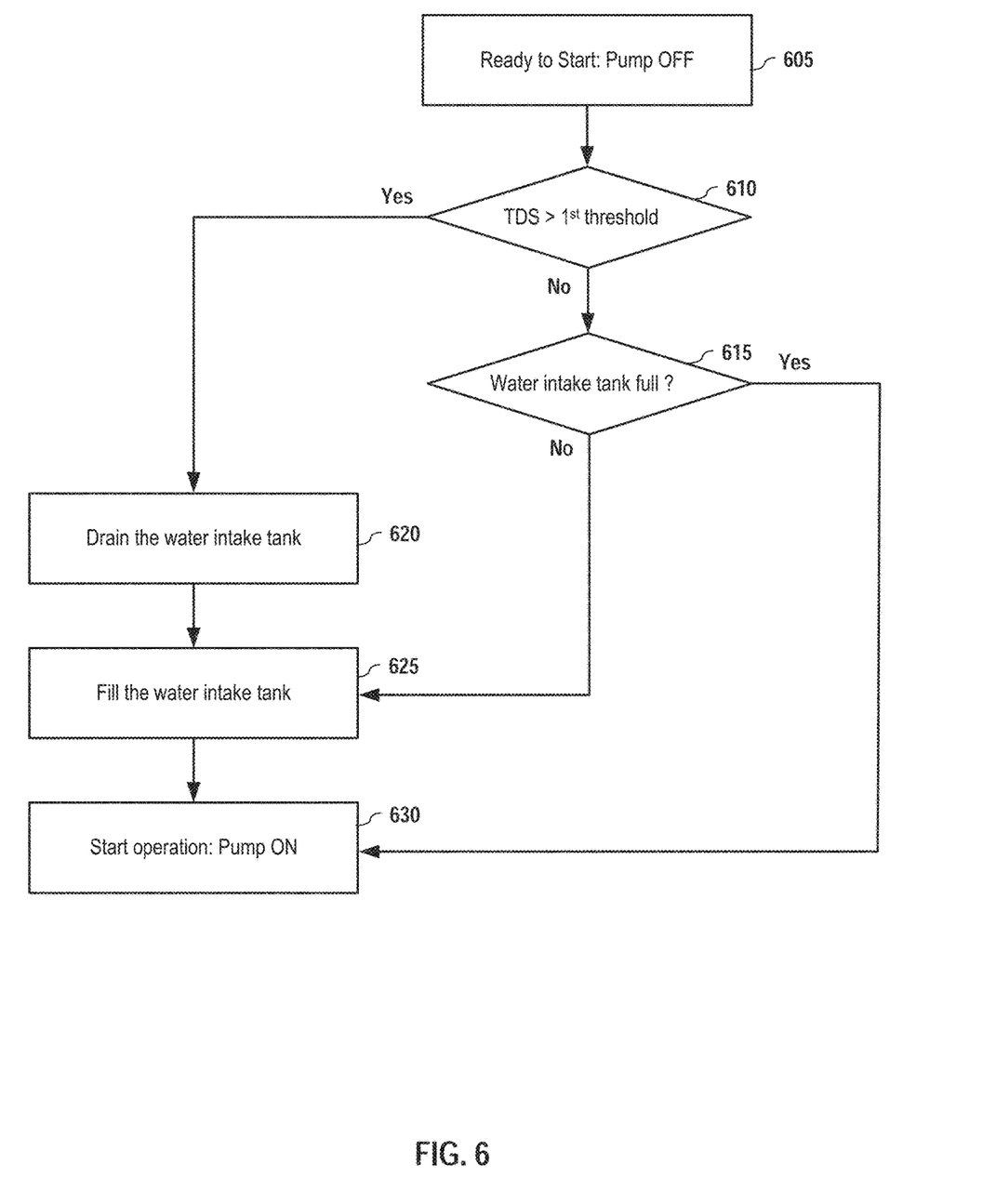
FIG. 6 is an alternative water treatment system starting process, according to various embodiments of the invention.

FIG. 5 is a water treatment system starting process, according to various embodiments of the invention. In step 505, the water treatment system is ready to start with the controller powered up. The water pump 120 is OFF. In step 510, the controller checks whether the water intake tank is empty by reading the input from the lower level sensor 116. If not, the controller compares the water parameter, e.g. the TDS concentration measured by the first TDS sensor 118, of water within the water intake tank to a first threshold in step 515. In response to the measured TDS concentration is above the first threshold, the water intake tank is drained first in step 520 and then refilled in step 525. Afterwards, the water treatment system begins to operate in step 530 with the first pump 120 tuned ON. If the water intake tank is found empty in step 510, the process goes to step 525 directly to fill the water tank. In response to the measured TDS concentration is determined to be less the first threshold, the process goes to step 530 to turn on the first pump 120 to start operation. In embodiments, a "safety-check" procedure in further incorporated between step 525 and step 530 to guard against TDS sensor malfunction. For example, after water refilling in the water intake tank in step 525, the process goes to an additional TDS concentration reading and checking for the newly filled water in the water intake tank, before going to step 530. If the TDS concentration is still high (e.g., above the first threshold), it is highly possible for an indication of TDS sensor malfunction FIG. 6 is an alternative water treatment system starting process, according to various embodiments of the invention. In step 605, the water treatment system is ready to start with the controller powered up. The water pump 120 is OFF. In step 610, the controller compares the water parameter, e.g. the TDS concentration measured by the first TDS sensor 118, of water within the water intake tank to a first threshold. In response to the measured TDS concentration is less than the first threshold, the controller checks in step 615 whether the water intake tank is full by reading the input from the upper level sensor 114. In response to the measured TDS concentration is above the first threshold, the water intake tank is drained first in step 620 and then refilled in step 625. Afterwards, the water treatment system begins to operate in step 630 with the first pump 120 tuned ON. If the water intake tank is found not full in step 615, the process goes to step 625 directly to fill the water tank. If the water intake tank is found full in step 615, the process goes to step 630 to turn on the first pump 120 to start operation. In embodiments, the flow process also comprises "safety-check" procedures to guard against TDS sensor malfunction. For example, after water refilling in the water intake take in step 625, the process goes to an additional TDS concentration reading and checking for the newly filled water in the water intake tank, before going to step 630. If the TDS concentration is still high (e.g., above the first threshold), it is highly possible for an indication of TDS sensor malfunction.

Figure 7:
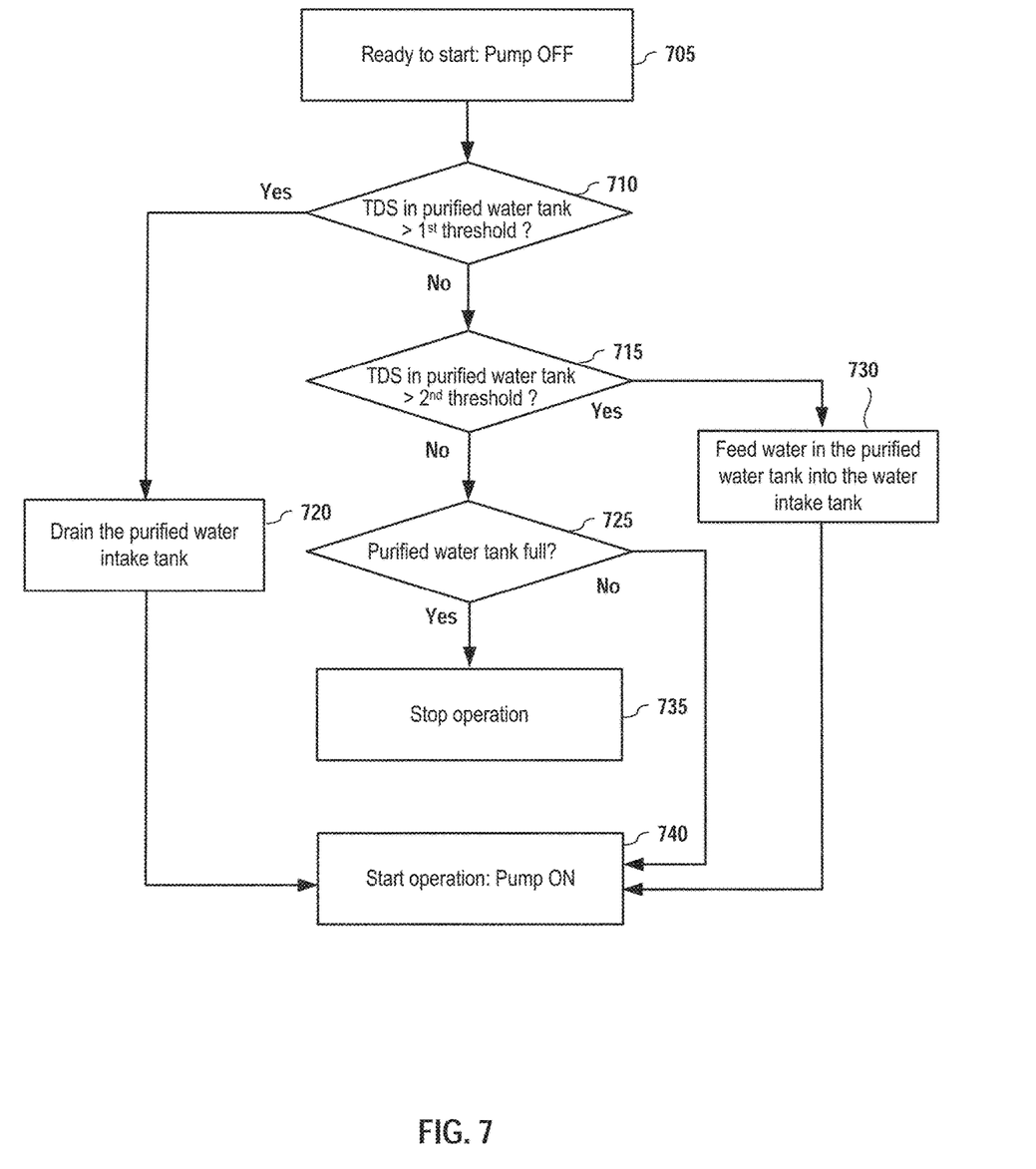
FIG. 7 is another alternative water treatment system starting process, according to various embodiments of the invention.

FIG. 7 is another alternative water treatment system starting process, according to various embodiments of the invention. In step 705, the water treatment system is ready to start with the controller powered up. The water pump 120 is OFF. In step 710, the controller compares the water parameter, e.g. the TDS concentration measured by the second TDS sensor 156, of water within the purified water storage tank to a first threshold. In response to the measured TDS concentration is less the first threshold, the controller checks in step 715 whether the TDS concentration measured by the second TDS sensor 156 is larger than a second threshold, a parameter less than the first threshold. For example, the first threshold is 2000 PPM and the second threshold is 500 PPM, which is a commonly acceptable criterion for human drinking water. In response to the measured TDS concentration is determined to be above the first threshold in step 710, the purified water storage tank is drained first in step 720 and then the water treatment system begins to operate in step 740 with the first pump 120 tuned ON.

In response to the measured TDS concentration is determined to be above the second threshold in step 715, water in the purified water storage tank is fed back into the water intake tank for re-processing using the second water pump 158 in step 730. Afterwards, the water treatment system begins to operate in step 740 with the first pump 120 tuned ON. In embodiments, the flow process also comprises "safety-check" procedures to guard against malfunction of the TDS sensor within the purified water storage tank. For example, after water in the purified water storage tank was initially drained or fed in to the water intake tank for recycling, purified water builds up as the system starts running. The new water within the purified water storage tank is continuously monitored. If the TDS concentration is still high (e.g., above the second threshold like in step 730), it is highly possible for an indication of malfunction for the TDS sensor within the purified water storage tank or the malfunction of treatment stage, such as membrane breakage, Under such situation, the system turns OFF immediately and alarm is activated.

In response to the measured TDS concentration is determined to be less the second threshold in step 715, the controller checks in step 725 whether the purified water storage tank is full by reading the input from the purified water level sensor 154 within the purified water storage tank. If the purified water storage tank is full, the process goes to step 735 to stop operation. If the purified water storage tank is not full, the process goes to step 740 to start operation with the first pump 120 turned ON.

The process shown in FIG. 7 is especially applicable to situations wherein the purified water storage tank does not output water very often. Water with the purified water storage tank may deteriorate again and therefore it is desirable to check water quality before the water treatment system operation.

Figure 8:
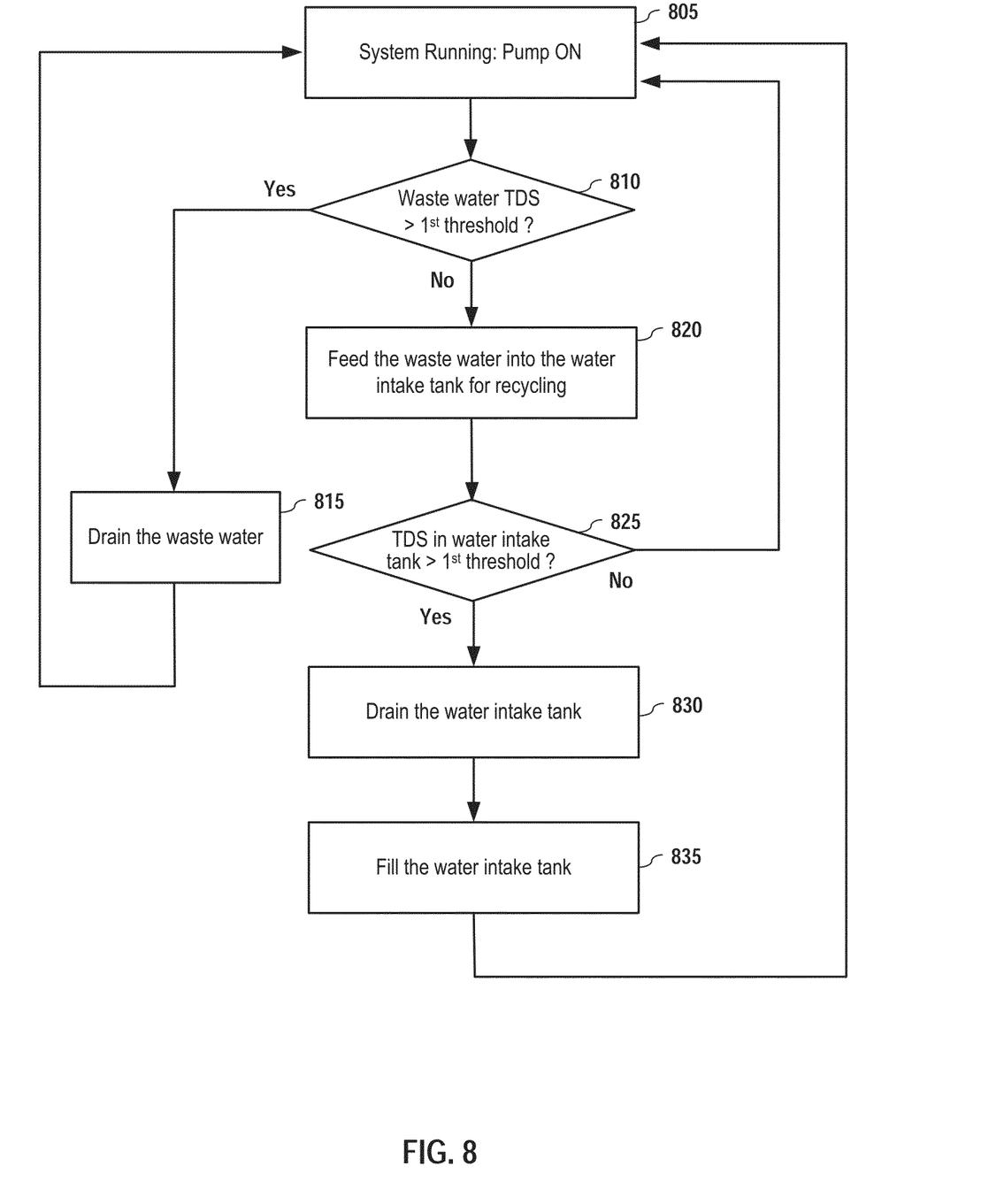
FIG. 8 is a water treatment system operation process with waste water recycling option, according to various embodiments of the invention.

FIG. 8 is a water treatment system operation process with waste water recycling option, according to various embodiments of the invention. In step 805, the water treatment system is running with the water pump ON. Water is fed from the water intake tank 110 into the pretreatment stage 130 and pre-treated water 132 is fed into the treatment stage 140 for further treatment. The treatment stage 140 outputs filtered water 142 and waste water 144. In step 810, the controller compares the TDS concentration of the waste water measured by the third TDS sensor 146. In response to the measured TDS concentration is above the first threshold, the waste water is drained in step 815 and the process then goes back to step 805 for continuous running. In response to the measured TDS concentration is less than the first threshold in step 810, the waste water is fed back into the water intake tank in step 820. Afterwards, the controller compares the TDS concentration measured by the first TDS sensor 118, of water within the water intake tank to a first threshold in step 825. In response to the measured TDS concentration is above the first threshold, the water intake tank is drained in step 830 and then refilled in step 835. The process then goes back to step 805 for continuous operation. In response to the measured TDS concentration is less the first threshold in step 825, the process goes back to step 805 directly for continuous operation.

In embodiments, all sensors, including water quality, level, battery level and pressure, temperature and flow rate are monitored at all times. While system not running, these sensors are monitored at lower frequency, compared to the situation when the system is running, to conserve energy. Decision to start, stop, rinse, drain, fill or dispense permeate water is made based on information from selected or all sensors. The description and corresponding flow diagram each depicts one case among many embodiments implemented by the controller.

In embodiments, a water treatment system operation process may be implemented with steps different from the embodiment shown in FIG. 8. For example, a water treatment system operation process may be implemented without the steps 810 and 815. In such as an alternative embodiment, the waste water is fed directly into the water intake tank for recycling, without checking TDS concertation. The process then follows the steps 820, 825, and 830. Such an alternative embodiment provides a simplified water treatment process.

Figure 9:
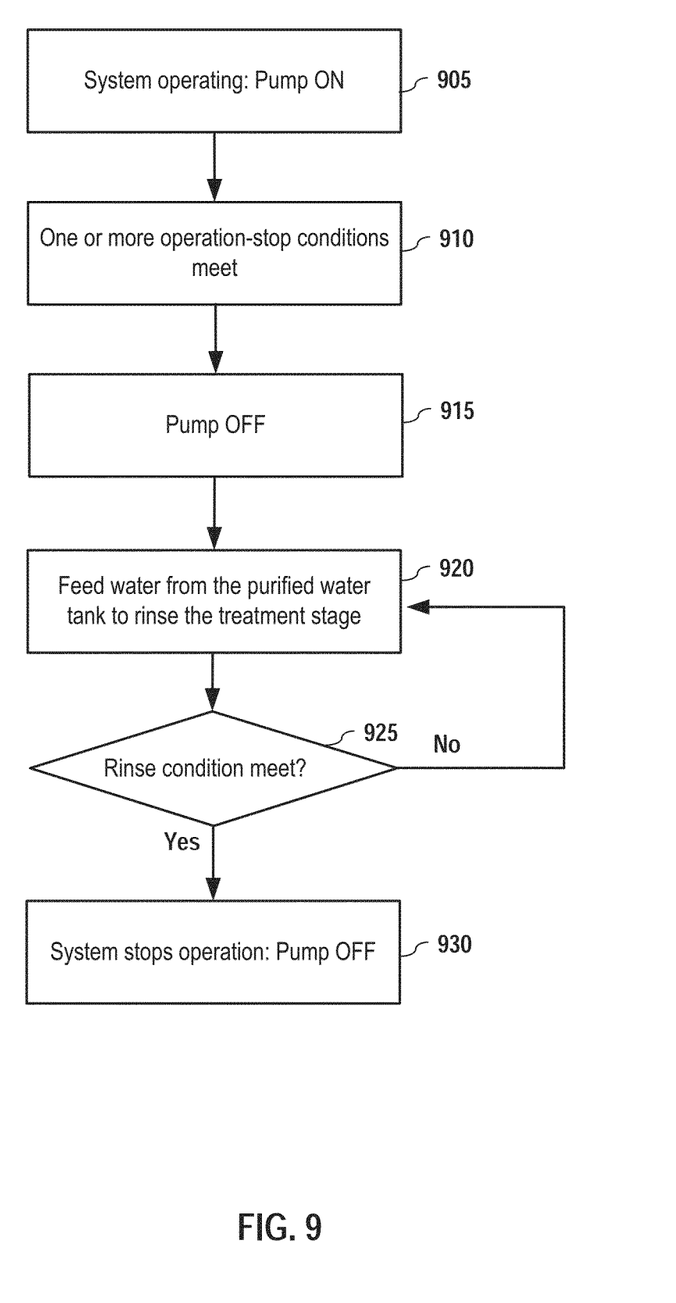
FIG. 9 is a rinse process for the water treatment system, according to various embodiments of the invention.

FIG. 9 is a rinse process for the water treatment system, according to various embodiments of the invention. When a conventional water treatment system stops operation, the Nanofiltration membranes may still be soaked within static pre-treated water. Although the pretreatment stage removes some detrimental particulates, some residual particles may still attach or bond to the membranes, clog some membrane orifices and even cause damage to the membranes, especially if the water treatment system stops operation frequently or for a long interval. FIG. 9 shows an embodiment of rinse process to address this issue.

In step 905, the water treatment system is operating with the first water pump 120 ON. In step 910, the controller detects one or more operation-stop conditions, which may include one or more conditions selected from the following:

a) The purified water storage tank 150 is full;
b) The water intake tank 110 is empty;
c) The battery voltage is less than a pre-determined voltage threshold, indicting not enough power reserve to support further operation;

b) The water pump 120 does not provide desired water pressure to support optimal performance of the pretreatment stage or the treatment stage;
e) Stop operation request input by a user;
f) Pre-scheduled stop for system maintenance, such as filter change for the pretreatment stage;
g) Prescheduled or automatic rinse cycle based on one or more of the following (1) total processed feed water volume (registered through flow meter) since last rinse; (2) Total permeate water produced since last rinse cycle; (3) Change in membrane pressure differential; (4) Change in production rate.

In embodiments, beyond the above "normal" stop conditions, the operation-stop conditions may further include some safety-related situations, where there is potentially a mechanical or electrical problem, such as:

h) Water quality sensor or water level sensor malfunction;
i) Sudden drop in membrane pressure;
j) Abnormal power consumption In embodiments, when conditions h)-j) occur, the system immediately shuts down without rinse cycle by directly going to step 930. Simultaneously, alarm may be activated for user attention. The alarm may be an audible voice, a flashing message the display or both.

Upon detecting one or more operation-stop conditions, the controller 210 turns off the first water pump 120 in step 915, and opens the second controllable valve 170 in step 920 such that water from the filtered storage tank 150 can be fed back into the treatment stage 140 by the second pump 158 to rinse the membranes 143. In embodiment, all applicable output water resulting from the rinse process is fed back into the water intake tank for recycling.

In step 925, the controller 210 checks whether a rinse condition is met. The rinse condition may be a pre-determined rinse volume, or a pre-determined rinse time, which can be monitored by a timer circuit within the controller or by a mass flow meter coupled to the second controllable valve 170. If the rinse condition is not met, the process goes back to step 920 to continue rinse process. Once the rinse condition is met, the controller turn off the system to stop operation in step 930.

One skilled in the art will recognize that various implementations may be realized within the architecture described and scope of the invention. For example, a water treatment process may be implemented with only selected steps, with different orders form the presented embodiments shown in FIGS. 5-9, with a combination of selected steps presented in different embodiments, or with some selected steps in more than one embodiment concurrently. A water treatment process may be implemented by monitoring one or more water quality parameters other than TDS. Such treatment process shall also be within the scope of this invention.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for water treatment, the method comprising:
receiving, at a water intake tank water, input from one or more water resources, the water intake tank comprising at least one water level sensor to monitor water level within the water intake tank and a first water quality sensor to monitor water quality within the water intake tank, the at least one water level sensor and the first water quality sensor coupled to a controller;

pumping water from the water intake tank with a first water pump coupled to the controller for operation control, the controller stops the first water pump from operation when the monitored water quality within the water intake tank is above a first threshold, the first threshold is a predetermined value;

receiving, at a pretreatment stage, the pumped water from the first water pump for pretreatment;

receiving the pretreated water at a treatment stage comprising one or more filtering membranes;

outputting, from the treatment stage, purified water and waste water, water quality of the waste water is monitored by a second water quality sensor coupled to the controller, when the monitored water quality of the waste water is above the first threshold, the waste water is drained, when the monitored water quality of the waste water is below the first threshold, the waste water is fed back into the water intake tank for recycling;

collecting the purified water at a purified water storage tank; and monitoring the purified water within the purified water storage tank with a third water quality sensor, in response to the monitored water quality of the purified water being below the first threshold but above a second threshold, feeding the purified water within the purified water storage tank back into the water intake tank, the second threshold is a value less than the first threshold.

2. The method of claim 1 wherein the controller is coupled to the at least one water level sensor, the controller enables a filling process to fill the water intake tank when the at least one water level sensor indicates the water intake tank is not full before turning on the first water pump.

3. The method of claim 2 wherein the first and second water quality sensors are total dissolvable solid (TDS) sensors to measure concentration of dissolved solid particles.

4. The method of claim 2 wherein the controller stops the first water pump from operation when the monitored water level within the water intake tank indicates an empty tank.

5. The method of claim 2 further comprising:
draining the purified water within purified water storage tank when the monitored water quality is above the first threshold.

6. The method of claim 2 further comprising:
monitoring water level within purified water storage tank with a purified water level sensor; and
stopping the first pump from operation when the purified water storage tank is full.

* * * * *